2,135,042

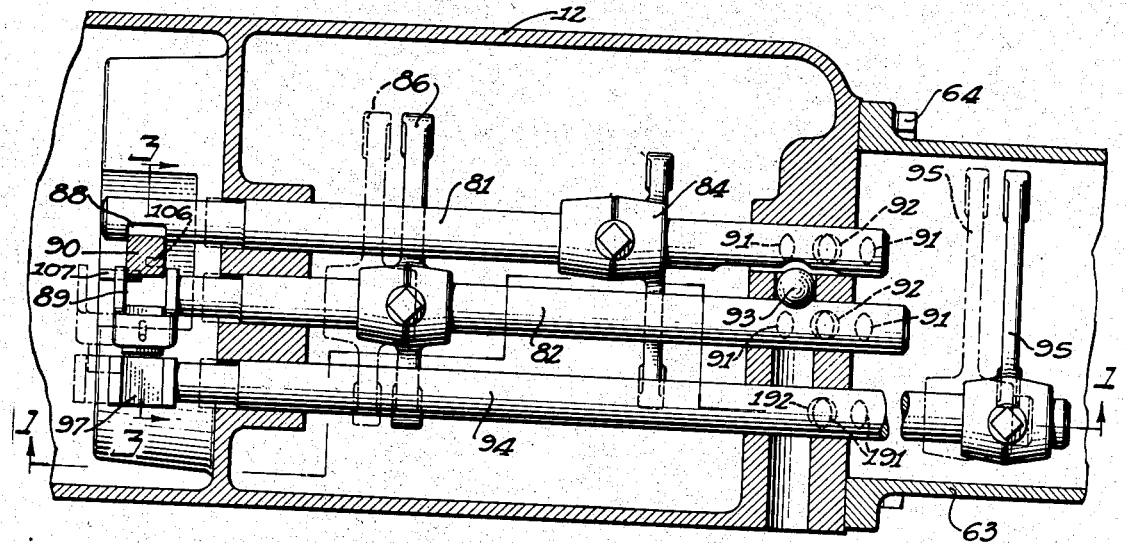
Fig. 2
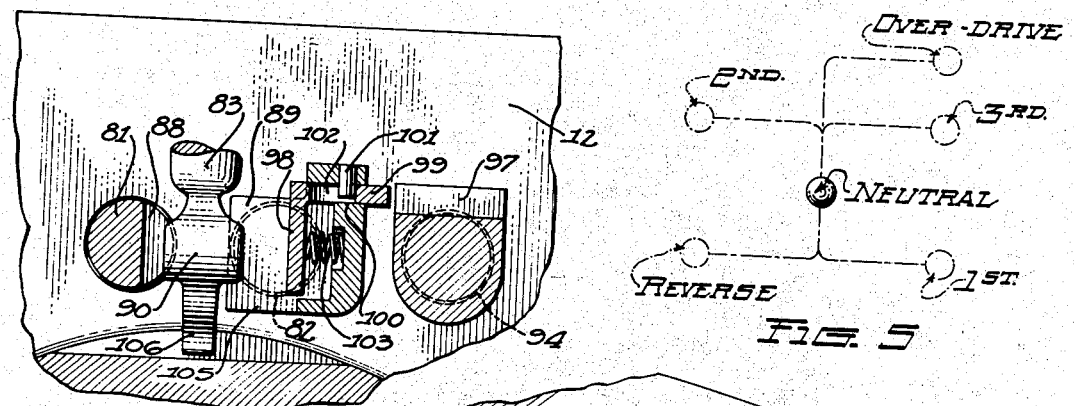
Fig. 3
Fig. 5
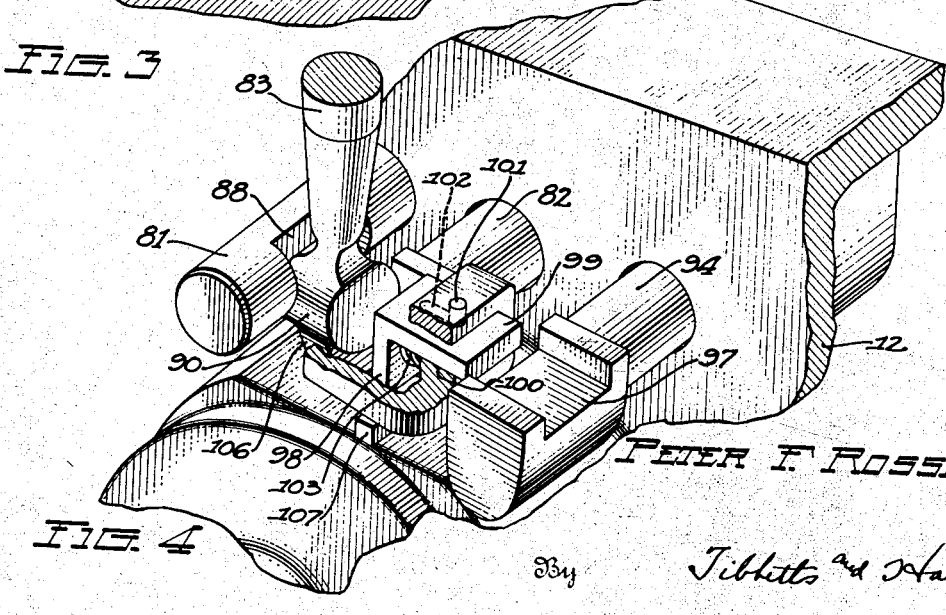
Fig. 4
Inventor
PETER F. ROSSMANN
By Tibbitts and Hart
Attorneys Patented Nov. 1, 1938

UNITED STATES PATENT OFFICE 2,135,042

TRANSMISSION CONTROL FOR MOTOR VEHICLES

Peter F. Rossmann, Detroit, Mich., assignor to Packard Motor Car Company, Detroit, Mich., a corporation of Michigan Application January 19, 1935, Serial No. 2,510

11 Claims. (Cl. 74—473)

This invention relates to driving mechanism and more particularly to change speed mechanism in driving mechanism.

An object of the invention is to provide change speed mechanism with a new and novel form of overdrive gearing.

Another object of the invention is to provide a new and novel form of shift means for change speed mechanism.

A further object of the invention is to provide a compact and simple shift means for transmission having more than three forward speed relations and one reverse driving relation.

Still another object of the invention is to provide shift means for an overdrive mechanism in a change speed driving device which is operated in conjunction with one of a pair of shift rails.

Other objects of the invention will appear from the following description taken in connection with the drawings, which form a part of this specification, and in which:

Fig. 2 is a view in section taken substantially on line 2—2 of Fig. 1, the shifter mechanism being in neutral position.

Fig. 3 is a view in section taken substantially on line 3—3 of Fig. 2.

Fig. 4 is a perspective view of one end of the shift mechanism.

Fig. 5 is a diagrammatic view showing the path the shift lever handle takes in engaging the driving mechanism control rails for effecting different rates and directions of drive.

Figure 1:
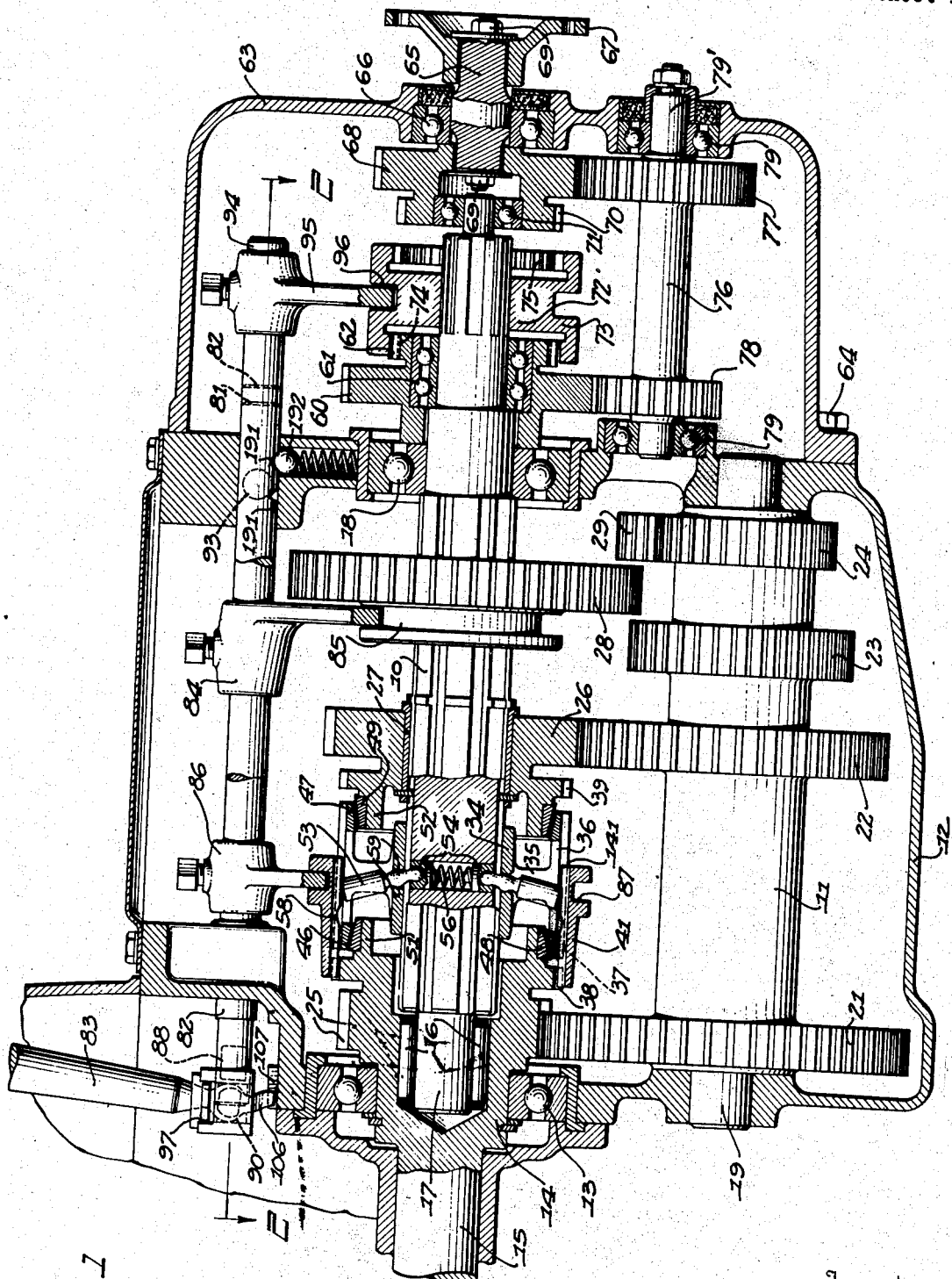
Fig. 1 is a vertical sectional view showing a motor vehicle driving mechanism constructed in accordance with the invention taken on line 1—1 of Fig. 2 with the shifter mechanism in overdrive position.

Referring to the drawings, in Fig. 1 is shown a motor vehicle driving mechanism comprising a splined shaft 10 and a countershaft 11 mounted in a housing or casing 12. The front wall of the housing carries a suitable bearing 13 in which is mounted the enlarged end 14 of a driving shaft 15, which may be the vehicle clutch shaft, driven from an engine through conventional clutch mechanism, not shown. Enlarged end 14 of the clutch is formed with an axial recess for the reception of bearing means 16 in which the reduced forward end 17 of the transmission shaft 10 is journalled. The rear end of the shaft 10 is journalled in a bearing 18 supported in the rear wall of the housing 12. The counter shaft 11 is in the form of a hollow spool mounted to rotate on an arbor 19 supported at its ends by the front and rear walls of the transmission casing, such spool being formed with a number of integral gears 21, 22, 23 and 24. Of these, the gear 21 is in constant mesh with the gear or pinion 25 formed on the enlarged end 14 of shaft 15, so that the countershaft 11 is constantly connected to and driven from this clutch shaft 15 in the well known manner. The gear 22 is also constantly in mesh with the gear 26 which is mounted for rotation on a bearing sleeve 27, pressed or otherwise rigidly mounted on the spline shaft 10 as will be readily understood.

Gears 23 and 24 constitute the low speed and reverse gears respectively, and are adapted to drive a gear 28 which is splined to and slidable on shaft 10, this gear 28 being directly engageable with the gear 23 or driven from the gear 24 through a reverse idler pinion 29 in the well known manner. The gear 28 is shiftable axially to engage with the gear 23 to provide a first speed forward drive or it may be moved to mesh with the pinion 29, which is in mesh with the gear 24, to provide a reverse drive. Second speed drive is provided by connecting the constant mesh gear 26 to the shaft 10, and a third speed forward drive is secured by coupling the shafts 10 and 15.

To provide second and third speed connections, the forward portion of shaft 10 is provided with a clutch device which is slidably secured to the shaft between the gears 25 and 26. Hub 34 is slidably mounted on the splined portion of shaft 10 to rotate therewith. A web 35 extends radially from the hub and a rim 36 extends around the web periphery, the outer face of the rim being formed with splines 37. Clutch ring 41 is slidably mounted on and surrounds the rim 36, and is provided with internal splines 141 cooperating with the splines 37 to provide a driving connection. Forward movement of the ring will engage the internal splines 141 with the teeth 38 formed on the shaft end 14 to provide a direct drive between shafts 15 and 10 and rearward movement of the ring will engage the internal splines with teeth 39 formed on gear 26 to provide a drive between gear 26 and shaft 10, gear 26 being driven at a reduced speed from shaft 15 through gears 25, 21 and 22. In an intermediate position the teeth 141 will engage neither the teeth 38 nor 39.

To perform the clutching operation just described without shock or clash, a synchronizing means is provided for bringing the pairs of clutch teeth 141—38 or 141—39 to the same speed before being positively engaged. The oppositely disposed inner edges of the rim 36 are formed with conical brake or friction clutch surfaces 46 and 47, the surface 46 being adapted to contact a conical friction clutch ring 48 when the hub 34 is moved forwardly and the surface 47 being adapted to contact a conical friction clutch ring 49 when the hub is moved rearwardly. These rings 48 and 49 are pressed or otherwise secured on axially disposed extensions 51 and 52 on the shaft end 14 and on the gear body 26 respectively.

The corresponding members 46—48 or 47—49 of each of these friction clutch devices are so spaced as to be engaged upon a relatively small axial movement of hub 34 from its neutral position, and with considerable pressure, so that the relatively rotating members are synchronized by being frictionally connected before engagement of the positive clutch device.

Operation of the synchronizer or friction clutch device is effected by movement toward clutching position of ring 41, through suitable lever mechanism. As shown, this mechanism comprises a pair of floating levers 53 fulcrumed at their inner ends in shaft 10 and adapted to communicate sliding motion of ring 41 to hub 34 at a reduced amplitude but with increased pressure. At their inner ends, the levers 53 are provided with rounded fulcrum portions seated in blocks 54 slidably mounted in a transverse bore through shaft 10. Such blocks are yieldingly urged apart by spring 56 located in the bore. The levers extend radially through slots in the clutch device, such slots extending through hub 34, web 35 and rim 36. The outer ends of the levers are slightly rounded so that each may engage in a shallow recess 58 formed in the inner face of two of the internal splines on the clutch ring 41. Intermediate its ends, each of the levers 53 has a bearing between suitable abutments 59 on hub 34, the relation of these abutments to the ends of the levers being such as to make the mechanical advantage about four to one.

With the driving mechanism so far described, wherein shaft 10 can be driven at three forward speeds and one reverse speed with a given engine R. P. M., I propose to associate an overdrive mechanism. Shaft 10 extends rearwardly through the rear casing wall and rotatably mounted on this extended shaft end is a gear 60. This gear is carried on bearing 61 and has a rearwardly projecting extension on which is formed external teeth 62. A casing extension 63 is secured by bolts 64 to the rear wall of housing 12 and encloses the overdrive mechanism as well as a portion of the drive mechanism. A driven shaft 65 is carried by bearing 66 in the end wall of the casing extension. On the rear end of the driven shaft is fixed a universal joint plate 67 and on the forward end of such shaft is fixed gear 68. Such gear and plate are splined on the shaft and secured axially thereon by nuts, as indicated at 69, the gear and plate being arranged to prevent axial displacement of the driven shaft relative to the rear wall of the casing extension. Gear 68 has a hollow forwardly extending portion on the exterior of which is formed teeth 70 which align with and are similar to teeth 62 on gear 60. In the hollow end of gear 68 is a bearing 71 for supporting the reduced rear end of shaft 10. Splined on the shaft 10 between gears 60 and 68 is a clutch hub 72 carrying a peripheral rim 73 having internal teeth 74 at one end for engaging teeth 62 and having internal teeth 75 at the other end for engaging teeth 70.

A lay shaft 76, having gears 77 and 78 formed or fixed thereon, is rotatably mounted on an arbor 79' which projects into the rear walls of the casing and casing extension, and suitable bearings 79 are arranged in such walls to carry the arbor. Gear 77 is in constant mesh with gear 68 and gear 78 is in constant mesh with gear 60. When the positive clutch device is shifted forwardly, see Fig. 1, to engage teeth 74 with teeth 62 then driving relation will be established from shaft 10 to gear 60 and through the gear cluster 76 to drive gear 68 and shaft 65. The gears in such driving connection are formed to increase the speed of rotation of shaft 65 relative to shaft 10 and thus an overdrive or high speed forward is provided from the third speed drive without increase in engine speed. This overdrive is employed mainly when a vehicle is traveling in flat country to increase speed without increasing power requirement. Under such circumstance the vehicle can be driven more economically and with less engine fatigue. When the positive clutch is moved to rear position teeth 75 mesh with teeth 70 and the shaft 60 will be driven at the same speed as shaft 10, the drive being through the clutch to gear 68.

The gearing in the casing 12 is controlled by conventional shift means comprising a pair of parallel rails 81 and 82 movable axially by a pivoted shift lever 83. Rail 81 has a clutch yoke 84 fixed thereon which engages a collar 85 on gear 28 and rail 82 has a yoke 86 fixed thereon engaging a groove 87 in the clutch rim 41. The rail 81 has a groove 88 therein facing a groove 89 in the rail 82 and the shift lever head 90 is located to be shifted into either groove and then shifted to move the selected rail axially. These rails have the usual detents 91 for registration with spring pressed balls 92 in the casing wall for maintaining certain axial rail positions and ball 93 cooperates with the rails to lock one from axial shifting prior to shifting of the other from a neutral position.

When the shift lever is in neutral or vertical position there will be no driving connection from shaft 15 to shaft 10. Moving the shift lever handle portion to the left will shift the head 90 to the right into the recess 88 in rail 81 and forward movement of the lever handle will move the rail rearwardly to engage gear 28 with pinion 29 producing a reverse drive from shaft 15 to shaft 10. Rearward movement of the handle end of the shift lever while engaging rail 81 will move gear 28 into engagement with gear 23 producing a low ratio drive from shaft 15 to shaft 10. Moving the shift lever handle portion to the right will shift the head 90 into recess 89 in rail 82 and forward movement of the lever handle will engage teeth 37 on the ring 41 with teeth 39 producing a higher ratio drive than the low ratio forward drive from shaft 15 to shaft 10. Rearward movement of the lever handle during engagement with rail 82 will move teeth 37 on the ring 41 into engagement with teeth 38 producing a still higher ratio drive from shaft 15 to shaft 10. These positions of the shift lever handle portion are shown diagrammatically in Fig. 5.

Associated with the conventional control mechanism just described, is provided a novel and compact form of control for the overdrive clutch. A third rail 94 extends adjacent and parallel with rail 82. This rail 94 projects into the casing extension and has fixed thereto a yoke 95 engaging a recess 96 in clutch hub 72. The forward end of rail 94 has a recess 97 aligning laterally with recesses 88 and 89 when in neutral position. A connector or actuator is slidably associated with the grooved portion of rail 82, such actuator being preferably an angular metal strip having a leg 98 extending into the recess 89 and a horizontal portion 99 slidable laterally in a slot 100 in the rail 82. A pin 101 is fixed to the rail 82 and extends through the slot 100 and into a slot 102 in the horizontal portion 99 of the actuator to limit lateral movement of the actuator. Between the leg 98 and a wall of the rail 82 is arranged a coil spring 103, such spring being substantially enclosed in recess 89 by the actuator.

When the shift lever head 90 is moved into groove 89 in rail 82 without moving the actuator to engage groove 97 in rail 94, then rail 82 can be shifted individually to effect second or third speed forward. When the head 90 is moved laterally in groove 89 pressing the actuator into groove 97 then rearward movement of the shift lever handle portion will move the head forwardly to shift the clutch yokes 86 and 95 together so that shaft 15 drives shaft 10 through engagement of teeth on the ring 41 with teeth 33 and shaft 10 will drive shaft 65 through gears 60, 78, 77 and 68 as shown in Fig. 1.

The rail 82 has a recess 105 for the reception of an extension 106 depending from the shift lever head. The casing below the extension has a flange 107 formed thereon so that when the actuator has been moved to engage in the groove 97, the extension will have to ride against the flange to move the rail 94 to position engaging the associated clutch in overdrive relation. The location of the flange is such that the extension must be moved beyond one side thereof to place the actuator in operative position. The rail 82 will thus be moved with rail 94 in order to establish third speed drive when the overdrive is established. When the lever is shifted to neutral the clutch hub 72 will be moved into position engaging teeth 75 with teeth 70 so that a driving connection is maintained for the first, second, third and reverse drives when either the rail 81 or rail 82 is shifted individually to form such connections. The flange extends only from neutral position to forward position of the shift lever head and is thus only effective to lock the rails 82 and 94 together when the actuator is in groove 97 and being shifted to establish third speed forward. The overdrive is in effect a fourth speed forward and is established without increasing the engine R. P. M. The rail 94 is maintained in its two effective extreme positions by a ball 192 engaging grooves 191.

The overdrive mechanism is compact and can be readily associated with conventional change speed mechanism. The overdrive control means is operated with and by the conventional control means usually employed with conventional change speed mechanism. Very little extra equipment and space is therefore required to incorporate this overdrive mechanism and control means with conventional drive mechanism.

Although the invention has been described in connection with specific embodiments, the principles involved are susceptible of numerous other applications which will readily occur to persons skilled in the art. The invention is therefore to be limited only as indicated by the scope of the appended claims.

What is claimed is:

1. In a change speed drive mechanism, shift means comprising two rails having recesses therein, a shift lever movable into and out of the recess in one of the rails, and slidably mounted means operable by said lever while in said recess for engaging in the recess in the other rail and locking the rails together for simultaneous shifting by the lever.

2. In a change speed drive mechanism, shift means comprising two parallel rails having transversely aligned recesses therein, a shift lever movable into the recess in one rail, a laterally movable actuator carried by said last mentioned rail and movable into the recess in the other rail, said actuator being moved into recess engaging relation by said lever, and spring means normally urging said actuator out of the rail recess.

3. In a change speed drive mechanism, a casing having a flange, a pair of parallel shift rails movable axially in said casing, a single shift lever directly engageable with one of said rails, actuator means operable by said lever for engaging the other of said rails, means acting to hold said actuator means out of rail engaging relation and means on said lever cooperating with said casing flange to maintain engagement of said actuator means with its rail during shifting operation of said lever.

4. In a change speed drive mechanism, shift means comprising a pair of parallel axially movable rails having transversely aligned recesses therein, a shift lever movable into one of the rail recesses and operable to shift said rail axially, an actuator slidable transversely in the recess of said last mentioned rail, and means on said last mentioned rail limiting movement of said actuator, said actuator being engageable by said lever for movement into the recess of the adjacent rail, said rails being movable axially simultaneously when said lever holds said actuator in the recess of the rail adjacent thereto.

5. In combination, a change-speed transmission having shiftable gears or clutches adapted to produce one reverse speed, three forward speeds and an overdrive speed, shifting mechanism including three rails, a first rail being movable to effect reverse and low forward speeds, a second rail being movable to effect intermediate and direct forward speeds, and a third rail being movable to effect a forward overdrive speed, a single lever directly engageable with either of said first and second rails and movable to shift the same individually to obtain the speeds effected thereby, and a shiftable actuator carried by said second rail for locking said second rail with said third rail, said actuator being moved into and held in locking position by said lever while engaging said second rail and shifting the same into and out of direct forward speed effecting position.

6. In a change speed drive mechanism, shift means comprising a pair of parallel axially movable rails having transversely extending aligned recesses therein, a lever shiftable in one of the rail recesses and operable to shift such rail in an axial direction, an actuator slidably mounted in the rail recess in which the lever is engageable in and shiftable into the recess in the other rail by said lever, spring means engaging said actuator to normally hold it out of the recess in the last mentioned rail, and means for limiting the movement of said actuator in the rail recess in which it is mounted.

7. In a change speed drive mechanism, shift means comprising two parallel rails having transversely extending aligned recesses therein, a shift lever movable into the recess in one rail, an actuator mounted in the rail recess into which the lever is movable and shiftable into the other rail recess by said lever, spring means urging said actuator away from engaging relation with the engageable rail, and means for guiding and connecting said actuator with the rail on which it is mounted.

8. In a change speed drive mechanism, shift means comprising a fork carrying rail having a transversely extending opening therein, a slotted actuator slidably mounted in the rail slot, a pin fixed to said rail projecting into the slot in said actuator, a second fork carrying rail having a recess therein adapted to align with the opening in the other rail, spring means associated with said actuator and the rail in which it is mounted normally urging the actuator away from the other rail, and a shift lever for engaging in the rail opening and shifting the actuator into the recess in the second rail.

9. In change speed drive mechanism, shift means comprising two rails having recesses therein, an actuator slidably mounted in the recess in one rail and movable to engage the recess in the other rail, means retaining said actuator with the rail on which it is mounted, and a shift lever movable into the recess in the rail carrying said actuator for shifting said rail and moving said actuator into the recess in the other rail.

10. In a change speed drive mechanism, a casing, first and second shift rails having transversely extending aligned recesses therein, a shift lever movable into the recess in the first rail, an actuator slidably carried in the recess in the first rail and movable to engage in the recesses in both rails, said actuator being movable into the recess of the second rail by said lever, a spring normally urging said actuator out of engagement with said second rail, said rails being shiftable by said lever when said actuator engages in their recesses, an extension on said lever, and a flange on said casing against which said lever engages while shifting both rails, said flange holding said lever in position to maintain the actuator in engagement with said second lever.

11. In a change speed drive mechanism, shift means comprising two rails, a lever shiftable to engage with and actuate one of said rails, and shiftable actuator means carried by said last mentioned rail for locking the two rails together, said shiftable actuator means being movable into position for locking the rails together by said lever while engaging the actuator carrying rail.

PETER F. ROSSMANN.